June 14, 1966  B. A. TYLER  3,256,125
METHOD OF REINFORCING A FIBER GLASS AND RESIN ROD
Filed Feb. 20, 1964  4 Sheets-Sheet 1
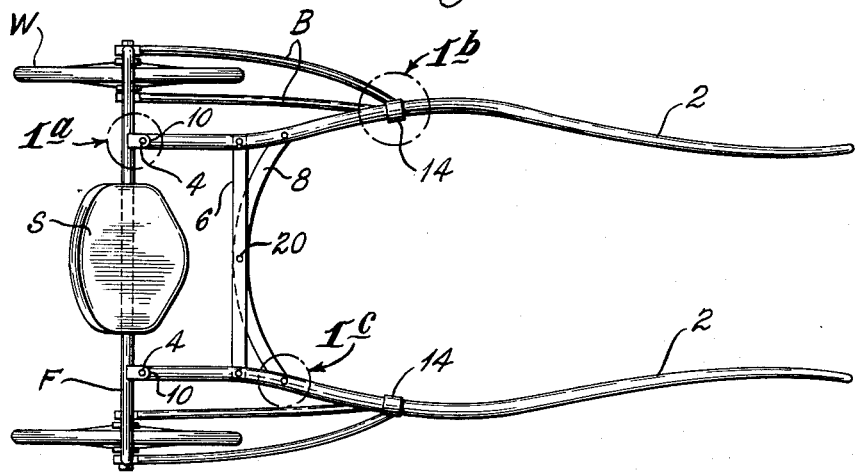
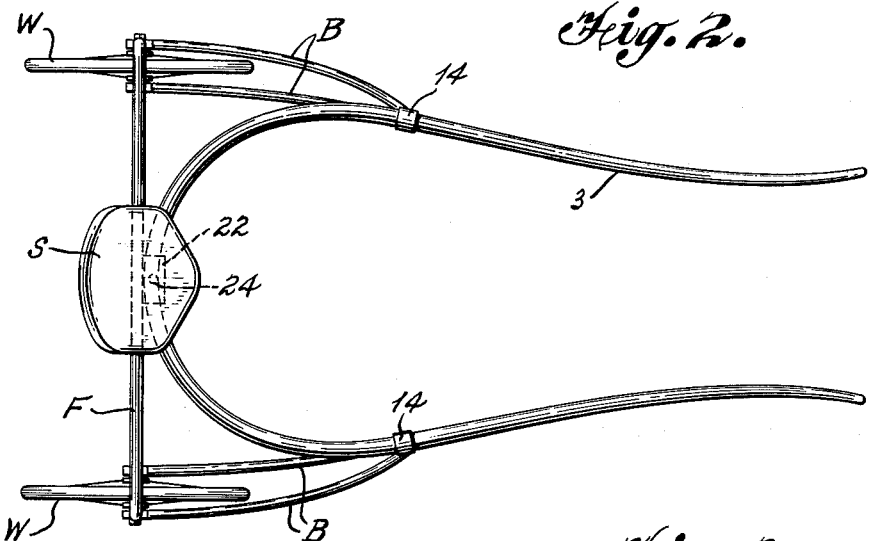
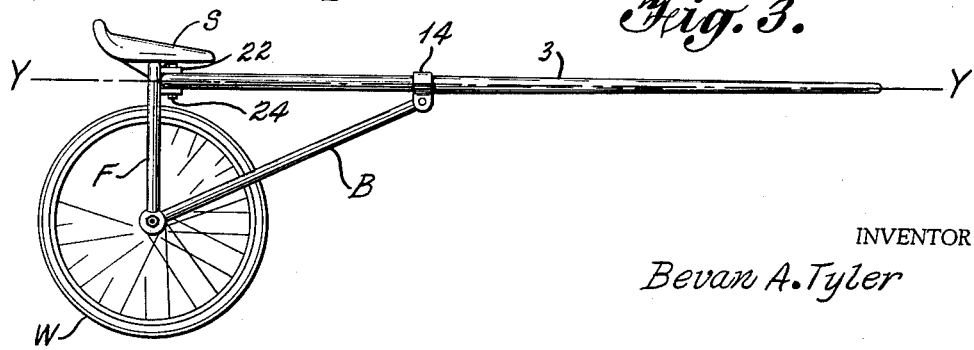
INVENTOR
Bevan A. Tyler
BY
Stevens, Davis, Miller & Mosher
ATTORNEYS June 14, 1966  B. A. TYLER  3,256,125
METHOD OF REINFORCING A FIBER GLASS AND RESIN ROD
Filed Feb. 20, 1964  4 Sheets-Sheet 2
Fig. 1ᵃ
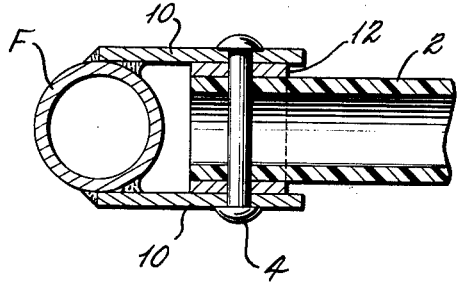
Fig. 1ᵇ
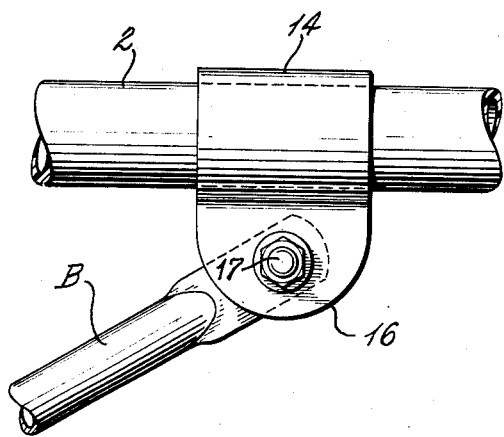
Fig. 1ᶜ
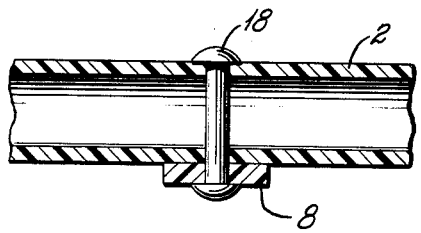
Fig. 10.
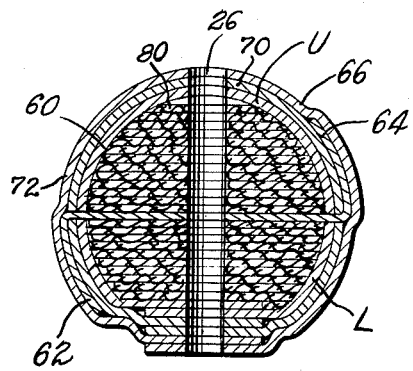
INVENTOR
Bevan A. Tyler
BY
Stevens, Davis, Miller & Mosher
ATTORNEYS June 14, 1966  B. A. TYLER  3,256,125
METHOD OF REINFORCING A FIBER GLASS AND RESIN ROD
Filed Feb. 20, 1964  4 Sheets-Sheet 3
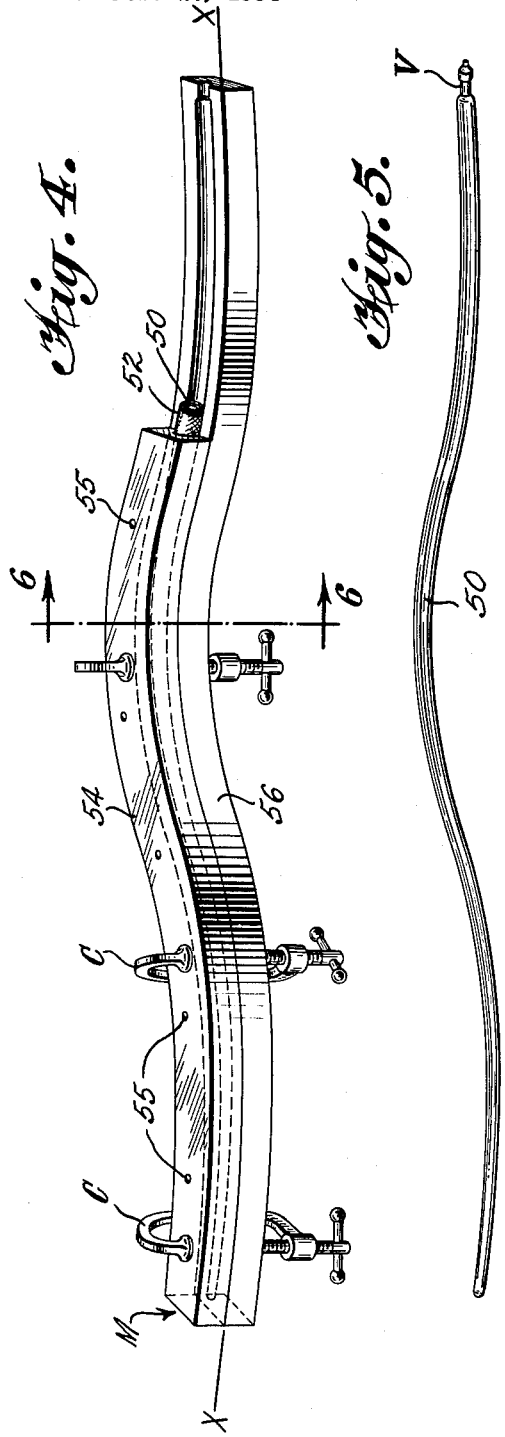
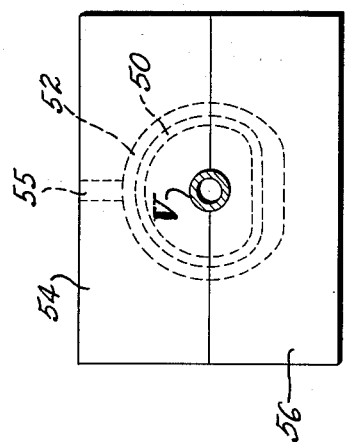
INVENTOR
Bevan A. Tyler
BY Stevens, Davis, Miller & Mosher
ATTORNEYS June 14, 1966  B. A. TYLER  3,256,125
METHOD OF REINFORCING A FIBER GLASS AND RESIN ROD
Filed Feb. 20, 1964  4 Sheets-Sheet 4

INVENTOR
Bevan A. Tyler

BY Stevens, Davis, Miller & Mosher
ATTORNEYS

United States Patent Office 3,256,125
Patented June 14, 1966

3,256,125
METHOD OF REINFORCING A FIBER GLASS AND RESIN ROD
Bevan A. Tyler, 63 Washington St., Johnstown, N.Y.
Filed Feb. 20, 1964, Ser. No. 346,327
5 Claims. (Cl. 156—184)

This invention relates to a method of reinforcing a fibre glass and resin rod which may be used, for example, in thills for racing sulkies and jog carts.

Thills now in use are most frequently made of wood and require constant maintenance to keep from warping and rotting. Denting of the wood is another hazard also difficult to avoid and is a cause for eventual splintering. If it becomes necessary to replace a wooden thill a duplicate thill is practically impossible to obtain since wood varies in both grain and knurl.

Thills made of light metals and their alloys are also used. These two are subject to denting which weakens metal more than wood. Likewise if it becomes necessary to replace a metal thill a duplicate thill is practically impossible since manufacturing tolerances have a great influence on the resiliency and balance of the finished product.

In the event a thill is broken during a race, both wooden and metal thills will present jagged edges, and this can be lethal to both the driver and the horse.

A fibre glass rod eliminates the disadvantages of wooden and metal rods, and has an outstanding advantage in that for comparative sizes the fibre glass rod is of substantially greater strength, although substantially lighter in weight.

The fibre glass rod further has the advantage that because of its greater flexibility and whip the rods follow the sidewise sway movements of the horse with a minimum transfer of this movement to the frame.

An object of this invention is to provide a method for producing a hollow fibre glass rod of desired shape and in which certain portions of the rod may be provided with solid partitions.

Figure 8:
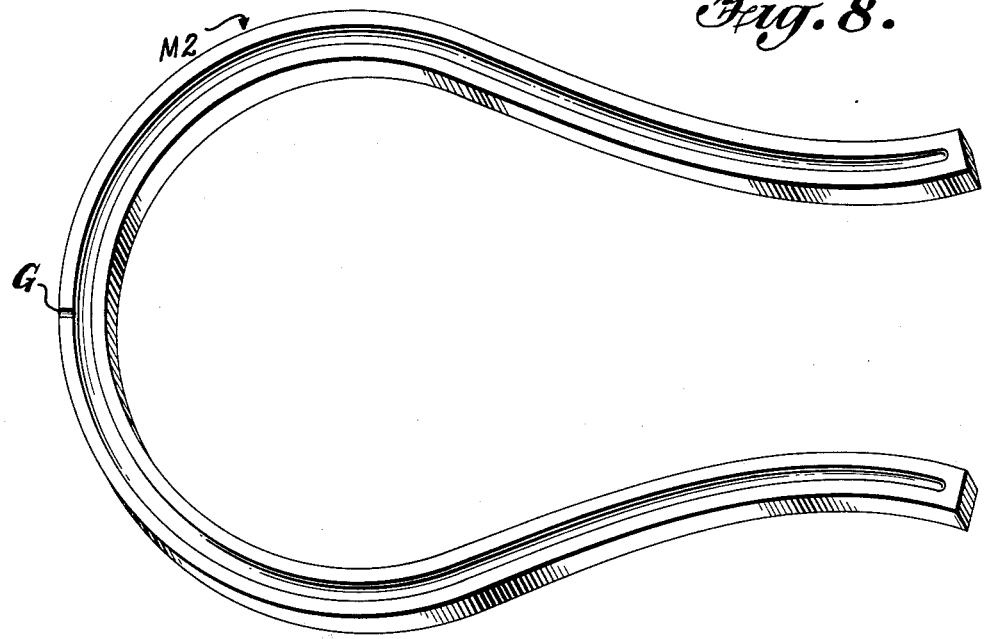
Figure 9:
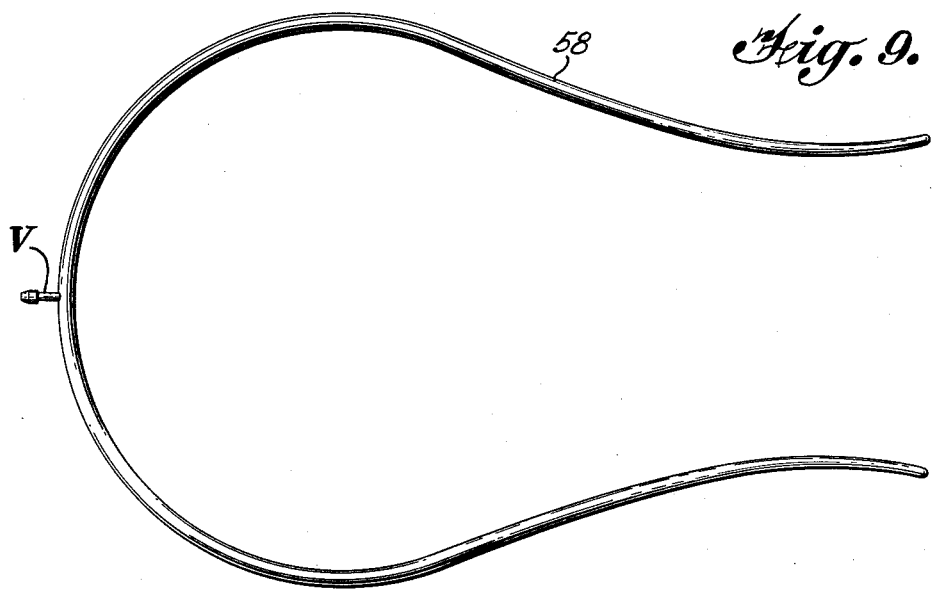

These and other objects of the invention will become apparent from the following description when read in conjunction with the accompanying drawings wherein:

FIGURE 1 is a plan view of a jog cart with a pair of thills;
FIGURE 1a is a section of the joint in the circle 1a of FIGURE 1;
FIGURE 1b is a view of the joint in circle 1b of FIGURE 1;
FIGURE 1c is a section of the joint in circle 1c of FIGURE 1;
FIGURE 2 is a plan view of a racing sulky having a single U shaped thill;
FIGURE 3 is a side view of FIGURE 2;
FIGURE 4 is a view of the mold used in the manufacture of the thill of FIGURE 1, partly broken away;
FIGURE 5 is a view of a bag mandrel used with the mold of FIGURE 4;
FIGURE 6 is a view on the line 6—6 of FIGURE 4;
FIGURE 7 is an end view of the mold with the valve stem of the bag mandrel in section;
FIGURE 8 is a view of one section of the mold used in making the thill of FIGURE 2;
FIGURE 9 is a view of the bag mandrel used with the mold of FIGURE 8; and
FIGURE 10 is a section through a solid partition of a thill showing a form of connecting means.

Referring to FIGURE 1 is shown a jog cart comprising a U shaped frame F supported on wheels W and including a seat S secured to the frame F in any suitable manner. Herein there is provided a pair of thills 2, each of which is connected at its inner end to the frame F, and connected to each other by cross braces 6 and 8. There are further provided braces B which connect the thills to the wheel axle to complete the assembly.

Each thill 2 is hollow and made of fibre glass. The connection of the inner ends of each thill to the frame is accomplished by bonding a metal collar 12 (see FIGURE 1a) to the inner end of the thill. The collar 12 is received between a pair of ears 10 projecting forwardly from the frame F, the ears and thill being interconnected by a rivet 4 extending through aligned receiving openings. Each thill is further provided with a metal collar 14 which is bonded thereon and provided with the projecting ears 16 (see FIGURE 1b) for receiving the forward ends of the braces B, and securing them together by suitable bolts 17. Each of the cross braces 6 and 8 is solid and they interconnect at their outer end to the respective thill by rivets 18 (see FIGURE 1c), and are interconnected centrally by a rivet 20.

More particularly, each thill 2 of FIGURE 1 is made by forming a flexible substantially circumferentially self-supporting bag 50 (see FIGURE 5) of polyethylene, of like curvature to a thill having a maximum diameter of two inches. The bag 50 is closed at one end, and provided at the other with a valve V, and serves as a mandrel upon which the fibre glass is wound to make the thill. The bag 50 is made by cutting two symmetrically opposite strips of polyethylene to correct curvature and then sealing their edges to form the tube or bag.

Following the formation of the mandrel fibre glass 52 is wound thereon and although woven fibre glass is preferred, random length or continuous filament glass mats may be used. During the convolute or spiral wrapping the fibre glass is treated with a suitable resin such as MR42 polyester epoxy resin-produced stylene monomer which is not air inhibited. Sufficient resin is used to completely cover the fibre glass and to fill all interstices. For want of a better term, saturation is used, to indicate the foregoing, it being appreciated that glass fibers have minimum porosity, so actual saturation of the glass is not accomplished. Obviously other types of resin may be used. During wrapping particular care should be taken to make each successive overlay or ply, as tight as possible over the preceding ply, thereby forcing out any entrapped air, in order that the finished product will be void free. Normally the bag or mandrel 50, if it is to be removed will be precoated with a suitable parting agent, such as silicon, to assure complete removal from the finished thill. In manufacturing a thill having a two inch maximum diameter, the bag has a one and one half inch maximum diameter when relaxed, and six layers of plies of fibre glass are required.

Following the wrapping, the wrapped mandrel is placed within the mold M (see FIGURE 4) which comprises top and bottom halves 54 and 56, which are symmetrically grooved to correspond to the shape of the finished thill. Upon placing the molds together they are secured by clamps C and air at approximately 20 lbs. p.s.i. is inserted into the tube 50 to provide an outwardly acting pressure to expand bag 50 to its maximum diameter of one and three quarter inches, thereby compressing the fibre glass outwardly againt the walls of the mold. The top half 54 of the mold M is provided with a plurality of spaced openings 55 extending therethrough in order to permit the escape of air upon the application of the clamps C, as well as the seepage of excess resin. It has been found that by using excess resin during the wrapping that when seeping ceases from holes 55, maximum pressure has been obtained throughout the length of the bag mandrel. Thereafter the wrapped tube is retained within the mold until the resin has set. Obviously the interior grooves of molds would also be pretreated with a parting agent such as silicon.

Although the foregoing process has been described utilizing the epoxy resin, it is apparent that a thermoplastic resin could be used. If a thermoplastic resin is to be used, the woven fibre glass would normally be pretreated and the resin advanced to B stage thus eliminating a wet layup. The molds M would likewise be made of a heat resisting material to permit its insertion within an oven for final heat treating of the thermoplastic to advance it to full curing.

As previously stated the thill shown is one having a maximum diameter of two inches and the bag mandrel has a maximum diameter of one and three quarter inches. This difference is kept constant throughout the length of the thill so that the resultant wall thickness is but one eighth of an inch. Thus the ratio of diameter to wall thickness is sixteen to one. Despite this, upon comparison with comparable size wooden and metal thills it was found that the fibre glass thill has two and one half times greater strength and it is three to four times lighter in weight.

Referring now to FIGURE 2, there is shown a racing sulky wherein parts corresponding to those of FIGURE 1 are given the same designation and numerals. In this form the thill is a one piece hollow fibre glass structure of U shape, and is secured to frame F at the butt portion of the thill. Preferably the thill is provided with a solid partition to receive the rivet 24 (see FIGS. 2, 3) the solid portion being more fully described hereinafter.

The thill 3 of FIGURE 2 is made in like manner to the thill 2 of FIGURE 1, except that there is provided a polyester U shaped tube or bag 58 (see FIGURE 9) shaped like the thill 3 and provided with a valve V at the butt of the U. In like manner the mold M2 (see FIG. 8) has a groove corresponding to the shape of the thill and each half (only the lower being shown) is provided with opening G for the valve V. The steps of the process wherein the fibre glass is wrapped onto the tube or mandrel 58, and the subsequent placing of it in the mold, together with the necessary treatment with resin, are the same as described with respect to the thills of FIGURE 1, except that in this embodiment spiral wrapping is preferred.

It may be desirable to provide solid partition walls within the thills 2 or 3 particularly at the points where they are connected to the frame F and brace arms B. Such a partition wall 80 is shown in FIGURE 10. In order to insert such partition walls it is necessary to split or cut the thill 2 in half along a horizontal plane parallel to the longitudinal axis to produce an upper half U and a lower half L. Resin saturated fibre glass strips are then laid in at the selected portions in the hollow of each half of the thill and built up to the plane of splitting as shown in FIGURE 10. When the resin is set the two halves are again bonded together by saturating a sheet of fibre glass 60 to form a sandwich structure, the same type of resin being used. The sheet 60 is of greater width than the diameter of the thill, and the extended portions designated as 62 and 64, are then wrapped around the thill, each in a clockwise direction. If desired, additional layers of saturated fibre glass may be added such as 70 and 72. As additional wrappings are added at points of connections the proper finished diameter of the thill forward thereof is not disturbed. It should be noted that FIGURE 10 shows a cross section at a point of connection and can readily be drilled to provide a bolt or rivet receiving opening 26.

Obviously the thill 3 of FIGURE 3 can be split along the axis of the elongation y—y as shown in FIGURE 3 and each half be built up at the point or points selected for reinforcement. The halves are then bonded together as heretofore described. The axis of elongation y—y is shown in FIGURE 3 as being in a single plane. However, thills in which the U is not plane in elevation as shown in FIGURE 3 can be made in the same manner, as it is only necessary to provide an upper and a lower half, each of U shaped cross section in which to build the partitions.

The resultant thill may be readily exposed to all weather conditions and the uniformity of construction results in improved balance, maintenance, and like thills may be repeatedly manufactured. It can readily be appreciated that the strength of the thill may be substantially increased by simply increasing the thickness of the walls thereof, this being controlled by the amount of fibre glass material used.

It should also be apparent that the thills can be made to any color desired during the manufacture simply by coloring the resin which is to be used. Preferably the thills are made using selfsetting resins, as these permit the splitting and insertion of partition walls, and the reassembly of the thills which cannot readily be accomplished with thermosetting resin, unless great care and accuracy is used to stop the advance of the resin during the initial curing of the thill within the mold.

It is apparent that many variations could be made, and that different types and weights of fibre glass and random fibre of continuous filament glass mats can be used, as it is only necessary to determine the wall thickness and then determine the number of layers which are required to make the finished wall thickness.

The following is claimed:

1. A method for providing a hollow elongated fibre glass rod with solid partition walls at selected portions along said rod, comprising the steps of, cutting said rod in half along a plane parallel to the longitudinal axis of said rod, applying a plurality of resin saturated fibre glass strips in each of the halves of said rod at said selected portions thereof to fill up said hollow portions, saturating a strip of fibre glass with resin, placing each half of said rod at said selected portions on opposite faces of said strip, and setting said resin.

2. A method for providing a hollow elongated fibre glass rod with solid partition walls at selected portions along said rod, comprising the steps of, cutting said rod in half along a plane parallel to the longitudinal axis of said rod, applying a plurality of resin saturated fibre glass strips in each of the halves of said rod at said selected portions thereof to fill up said hollow portions, saturating a strip of fibre glass with resin, said strip being of greater width than the diameter of the rod, placing each half of said rod at said selected portions on opposite faces of said strip, wrapping the uncovered portions of said strip around said assembled rod, and setting said resin.

3. A method for providing a hollow elongated fibre glass rod with solid partition walls at selected portions along said rod, comprising the steps of cutting said rod in half along a plane parallel to the longitudinal axis of said rod, applying a plurality of resin saturated fibre glass strips in each of the halves of said rod at said selected portions thereof to fill up said hollow portions, saturating a strip of fibre glass with resin, said strip being of greater width than the diameter of the rod, placing each half of said rod at said selected portion on opposite faces of said strip, wrapping the uncovered portions of said strip around said assembled rod, wrapping at least one additional resin saturated fibre glass layer around the outer periphery of said assembled rod at said selected portions, and setting said resin.

4. A method for providing a hollow elongated fibre glass rod with solid partition walls at selected portions along said rod, comprising the steps of cutting said rod in half along a plane parallel to the longitudinal axis of said rod, applying a plurality of resin saturated fibre glass strips in each of the halves of said rod at said selected portions thereof to fill up said hollow portions, saturating a strip of fibre glass with resin, said strip being of greater width than the diameter of the rod, placing each half of said rod at said selected portions on opposite faces of said strip, wrapping the uncovered portions of said strip around said assembled rod, wrapping at least one additional resin saturated fibre glass layer round the outer periphery of said assembled rod at said selected portions, setting said resin, and drilling said selected portion of said assembled rod in a plane perpendicular to the longitudinal axis thereof to provide an opening for the insertion of a fastening member.

5. A method of forming a hollow, elongated fibre glass rod and providing solid partition walls at selected portions along said rod, comprising the steps of forming an elongated expansible bag of desired contour, saturated fibre glass with resin and wrapping it around the bag, placing the wrapped bag in an elongated mold of similar contour to that of the bag, expanding the bag to thereby press the wrapping against the walls of the mold, setting the resin, removing the shaped rod from the mold, cutting said rod in half along a plane parallel to the longitudinal axis of said rod, applying a plurality of resin saturated fibre glass strips in each of the halves of said rod at said selected portions thereof to fill up said hollow portions, saturating a strip of fibre glass with resin, placing each half of said rod at said selected portions on opposite faces of said strip, and then setting said resin.

References Cited by the Examiner
UNITED STATES PATENTS

| | | | |
|---|---|---|---|
| D. 149,451 | 4/1948 | Shuttleworth | 280—63 X |
| 497,894 | 5/1893 | Rowe | 280—63 |
| 2,589,786 | 3/1952 | Engel et al. | 156—228 X |
| 2,912,043 | 10/1959 | Bargholtz et al. | 156—228 X |
| 2,995,781 | 8/1961 | Sipler | 156—228 X |
| 3,135,640 | 6/1964 | Kepka et al. | 264—94 X |

BENJAMIN HERSH, *Primary Examiner.*

A. HARRY LEVY, *Examiner.*